United States Patent
Yamaguchi

(10) Patent No.: US 9,874,784 B2
(45) Date of Patent: Jan. 23, 2018

(54) LIQUID CRYSTAL PANEL, LIQUID CRYSTAL DISPLAY APPARATUS, AND METHOD OF MANUFACTURING THE LIQUID CRYSTAL PANEL

(71) Applicant: Sakai Display Products Corporation, Sakai-shi, Osaka (JP)

(72) Inventor: Hidehiko Yamaguchi, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/913,787

(22) PCT Filed: Aug. 27, 2014

(86) PCT No.: PCT/JP2014/072464
§ 371 (c)(1),
(2) Date: Feb. 23, 2016

(87) PCT Pub. No.: WO2015/030065
PCT Pub. Date: Mar. 5, 2015

(65) Prior Publication Data
US 2016/0238866 A1    Aug. 18, 2016

(30) Foreign Application Priority Data
Aug. 29, 2013    (JP) .................... 2013-178572

(51) Int. Cl.
*G02F 1/1333*    (2006.01)
*G02F 1/1339*    (2006.01)
(Continued)

(52) U.S. Cl.
CPC .......... *G02F 1/1339* (2013.01); *G02F 1/1337* (2013.01); *G02F 1/13439* (2013.01);
(Continued)

(58) Field of Classification Search
CPC ............ G02F 1/1339; G02F 1/133512; G02F 1/1337; G02F 1/13439; G02F 2001/133302
(Continued)

(56) References Cited

U.S. PATENT DOCUMENTS 5,889,569 A * 3/1999 Okamoto .............. G02F 1/1339
349/110
2007/0263159 A1    11/2007 Kobayashi et al.
(Continued)

FOREIGN PATENT DOCUMENTS

JP    H11-264970 A    9/1999
JP    2007-304273 A    11/2007
(Continued)

*Primary Examiner* — Charles Chang
(74) *Attorney, Agent, or Firm* — Rudy J. Ng; Bret E. Field; Bozicevic, Field & Francis LLP

(57) ABSTRACT

A liquid crystal panel comprises a first substrate which is transparent and is provided with a transparent electrode and a wiring part having light-shielding properties, a second substrate which is transparent and is provided with a light-shielding layer having a first opening and is disposed opposite to the first substrate so that the transparent electrode faces the first opening, a liquid crystal part disposed between the first substrate and the second substrate, and a sealing part configured to seal the liquid crystal part between the first substrate and the second substrate. The light-shielding layer has a second opening. The sealing part has light-shielding properties and is configured to close the second opening.

8 Claims, 17 Drawing Sheets

(51) Int. Cl.
  *G02F 1/1335* (2006.01)
  *G02F 1/1337* (2006.01)
  *G02F 1/1343* (2006.01)

(52) U.S. Cl.
  CPC ............ *G02F 1/133512* (2013.01); *G02F 2001/133302* (2013.01)

(58) Field of Classification Search
  USPC ................................................. 349/110–111
  See application file for complete search history.

(56) References Cited

U.S. PATENT DOCUMENTS

| | | | |
|---|---|---|---|
| 2007/0291216 A1* | 12/2007 | Chan | G02F 1/1339 349/153 |
| 2010/0079718 A1* | 4/2010 | Sekiya | G02F 1/133512 349/153 |
| 2012/0099061 A1* | 4/2012 | Lee | G02B 5/22 349/110 |
| 2012/0242946 A1* | 9/2012 | Itoh | G02F 1/1339 349/153 |
| 2013/0250227 A1 | 9/2013 | Kira et al. | |

FOREIGN PATENT DOCUMENTS

| | | |
|---|---|---|
| JP | 2008-107488 A | 5/2008 |
| JP | 2010-032859 A | 2/2010 |
| JP | 2012-032506 A | 2/2012 |
| WO | WO2012074010 A1 | 6/2012 |

\* cited by examiner

F I G. 6
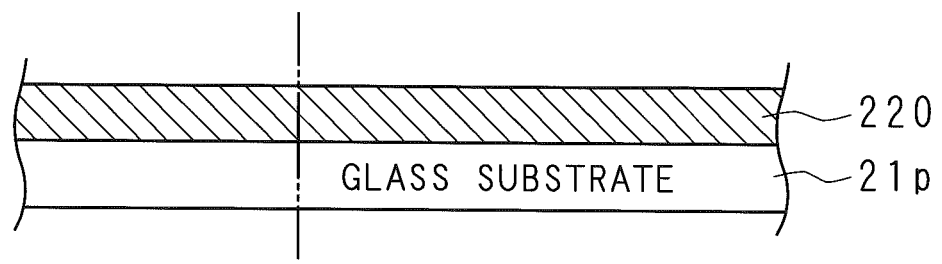

F I G. 8
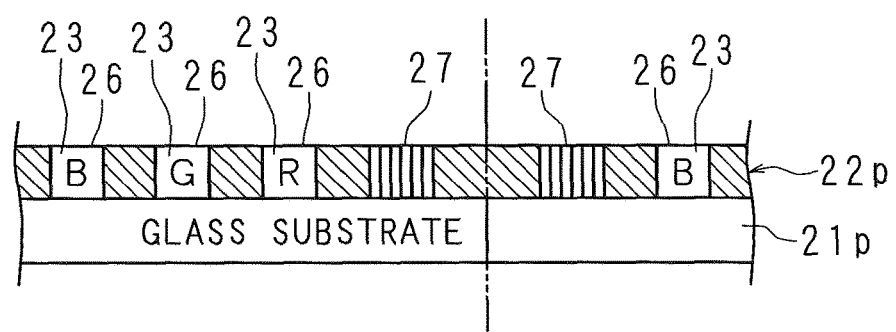

F I G. 10
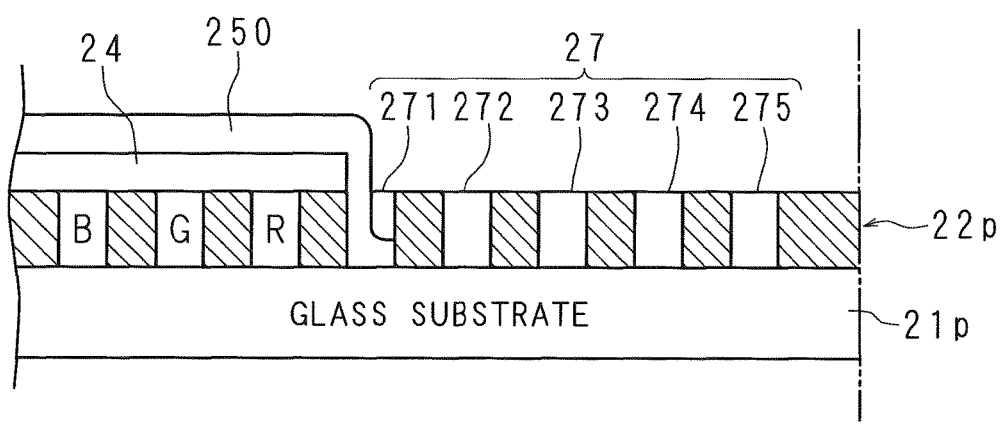

F I G. 13
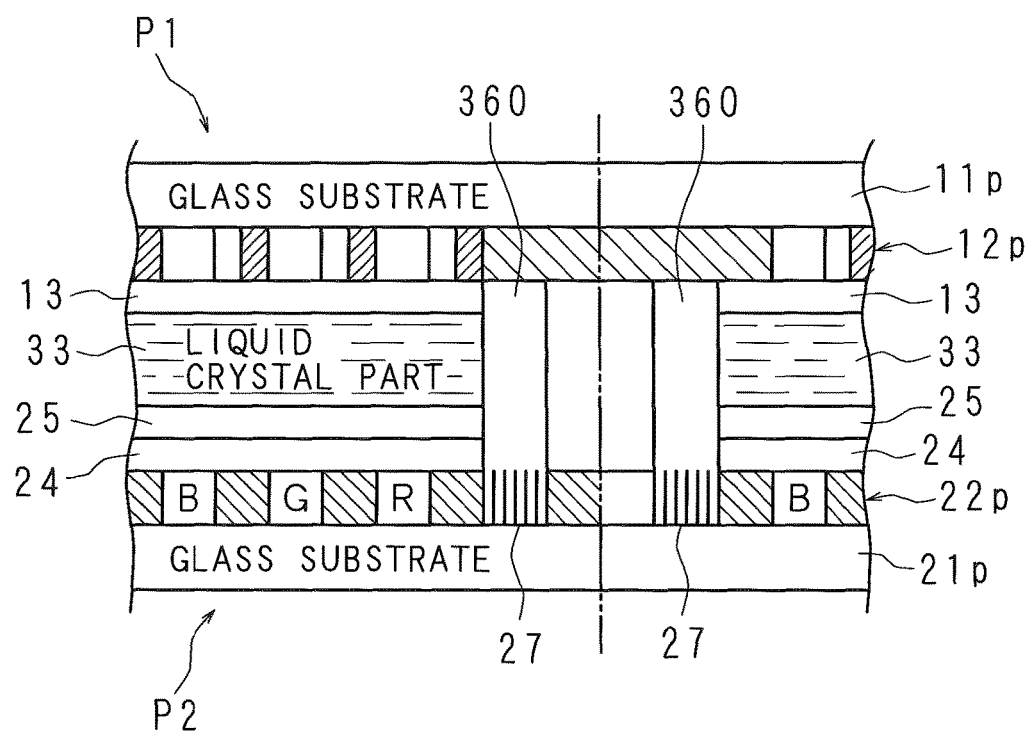

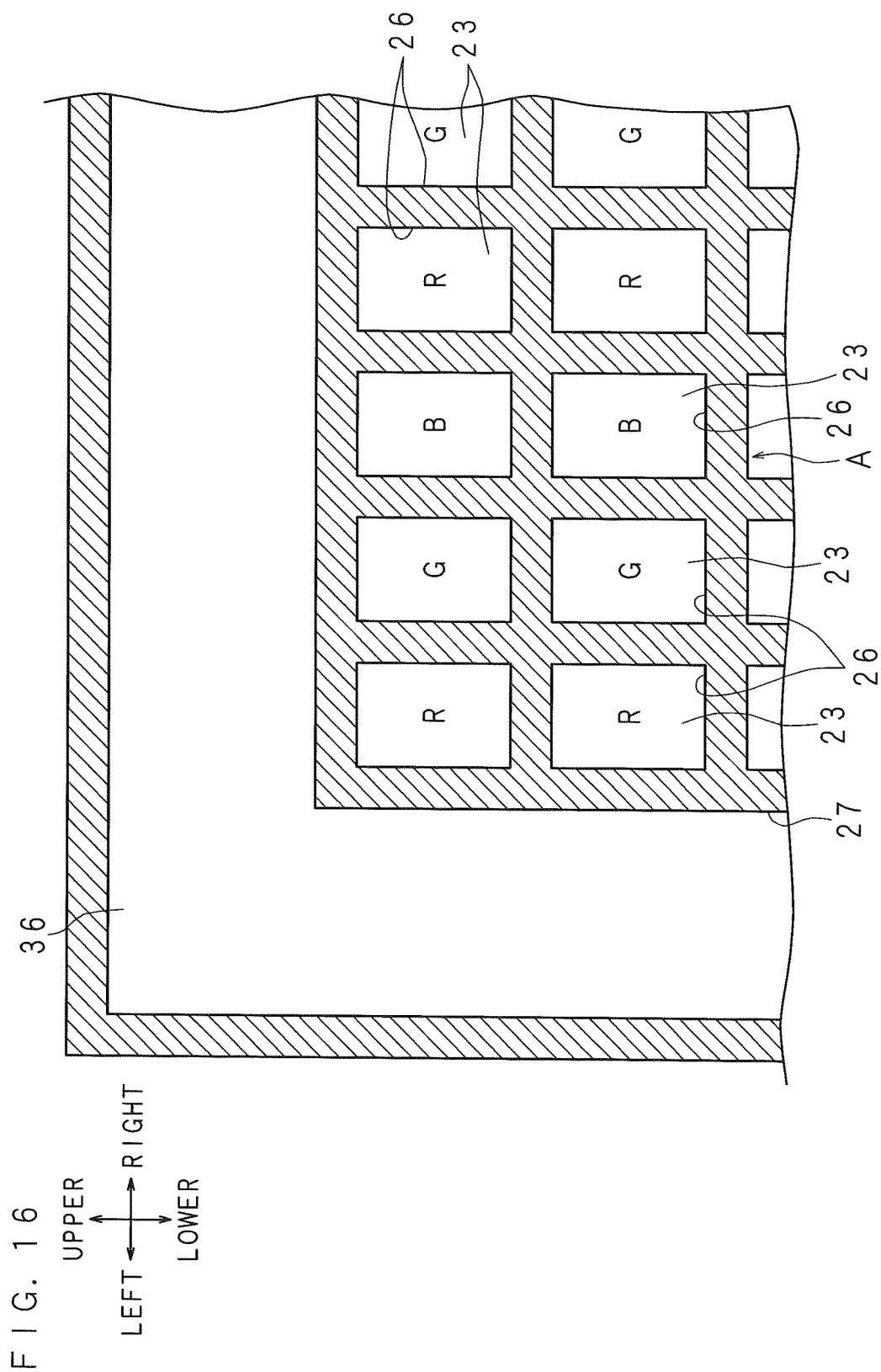

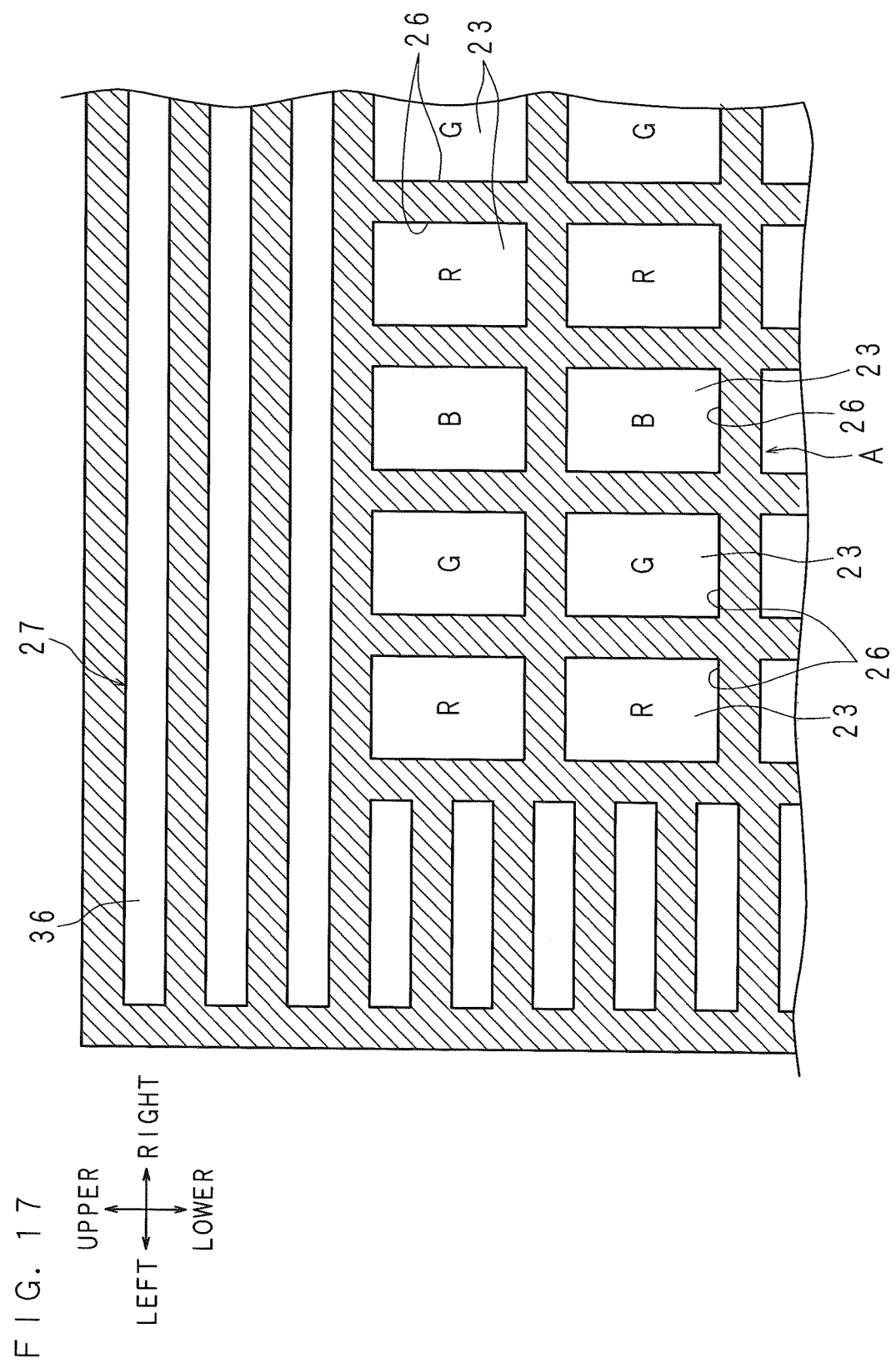

LIQUID CRYSTAL PANEL, LIQUID CRYSTAL DISPLAY APPARATUS, AND METHOD OF MANUFACTURING THE LIQUID CRYSTAL PANEL

CROSS-REFERENCE TO RELATED APPLICATIONS

This application is the national phase under 35 U. S. C. § 371 of PCT International Application No. PCT/JP2014/072464 which has an International filing date of Aug. 27, 2014 and designated the United States of America.

FIELD

The present invention relates a liquid crystal panel which is formed by sealing a liquid crystal part between substrates, a liquid crystal display apparatus, and a method of manufacturing the liquid crystal panel.

BACKGROUND

A liquid crystal display apparatus includes a liquid crystal panel and a backlight unit.

A conventional liquid crystal panel is formed by sealing a liquid crystal part between a TFT substrate and an opposite substrate disposed opposite to the TFT substrate (see Japanese Patent Laid-open Publication No. 2012-32506, which is hereinafter referred to as Patent Document 1, Japanese Patent Laid-open Publication No. 2008-107488, which is hereinafter referred to as Patent Document 2, and Japanese Patent Laid-open Publication No. 2010-32859, which is hereinafter referred to as Patent Document 3).

The TFT substrate is provided with thin film transistors (TFTs) which are transparent, a wiring part having light-shielding properties, and the like on a transparent substrate.

The opposite substrate is provided with a black matrix (BM) on a transparent substrate.

When manufacturing the liquid crystal panel, first, the TFT substrate and the opposite substrate are prepared. Next, an ultraviolet curable sealing material is applied to the opposite substrate in a frame shape. Further, liquid crystal is dropped in a portion which is surrounded by the sealing material in the opposite substrate. Then, the TFT substrate and the opposite substrate are disposed opposite to each other through the sealing material. Thereafter, the sealing material is irradiated with ultraviolet rays. Depending on types of the sealing material, after irradiating with the ultraviolet rays, heating treatment is executed. By irradiating with the ultraviolet rays, or by irradiating with the ultraviolet rays and heating, the sealing material is cured to be a sealing part.

The sealing part adheres the TFT substrate and the opposite substrate. The liquid crystal part formed of the dropped liquid crystal is sealed in a space surrounded by the sealing part, the TFT substrate, and the opposite substrate.

In the liquid crystal panel described in Patent Document 1 (a 'liquid crystal display apparatus' in text thereof), a non-light-shielding part is provided so as to surround the BM, and the sealing part is disposed in the non-light-shielding part. In other words, the sealing part is disposed at an outside from the BM. The sealing material is applied to the non-light-shielding part. And, the sealing material is irradiated with ultraviolet rays through the non-light-shielding part.

In the liquid crystal panel described in Patent Document 2 (a 'display apparatus' in text thereof), the BM has an opening. The sealing material is applied so as to partially close the opening of the BM. And, the sealing material is irradiated with ultraviolet rays through the opening of the BM.

In the liquid crystal panel described in Patent Document 3 (a 'TFT type liquid crystal display apparatus' in text thereof), the wiring part has an opening. The sealing material is applied so as to close the opening of the wiring part. And, the sealing material is irradiated with ultraviolet rays through the opening of the wiring part.

By the way, if irradiating the sealing material with ultraviolet rays is insufficient, impurities are eluted to the liquid crystal part from the uncured sealing material. The impurities eluted to the liquid crystal part cause a deterioration in image quality displayed on the liquid crystal display apparatus.

In this regard, in the liquid crystal panel described in Patent Documents 1 to 3, the sealing material may be sufficiently irradiated with the ultraviolet rays through the non-light-shielding part, the opening of the BM, or the opening of the wiring part.

SUMMARY

However, in the case of the liquid crystal display apparatus including the liquid crystal panel described in Patent Document 1, it is necessary to dispose the sealing part at the outside from the BM, as well as, an area of the opposite substrate tends to be increased. Therefore, it is difficult to narrow a frame of the liquid crystal display apparatus.

Meanwhile, in the case of the liquid crystal display apparatus including the liquid crystal panel described in Patent Document 2, the opening of the BM is not completely closed. Accordingly, light emitted by the backlight unit is reflected by the wiring part, for example, such that the light may be leaked through the opening of the BM. Such the light leakage causes a deterioration in image quality displayed on the liquid crystal display apparatus.

Further, in the case of the liquid crystal display apparatus including the liquid crystal panel described in Patent Document 3, electrical resistance of the wiring part is increased because it has the opening. If the electrical resistance of the wiring part is increased, transmission of various signals through the wiring part is unnecessarily delayed. Unnecessary delay in signal transmission may cause the deterioration in image quality displayed on the liquid crystal display apparatus.

But, if the wiring part is widened in order to decrease the electrical resistance of the wiring part, the area of the TFT substrate tends to be increased. Therefore, it is difficult to narrow the frame of the liquid crystal display apparatus.

In consideration of the above-mentioned circumstances, it is a major object of the present invention to provide a liquid crystal panel which facilitates a narrowing of a frame and improving image quality of a liquid crystal display apparatus, the liquid crystal display apparatus, and a method of manufacturing the liquid crystal panel.

A liquid crystal panel according to one embodiment of the present invention comprises a first substrate which is transparent and is provided with a transparent electrode and a wiring part having light-shielding properties, a second substrate which is transparent and is provided with a light-shielding layer having a first opening and is disposed opposite to the first substrate so that the transparent electrode faces the first opening, a liquid crystal part disposed between the first substrate and the second substrate, and a sealing part configured to seal the liquid crystal part between the first substrate and the second substrate. The light-shielding layer has a second opening. The sealing part has light-shielding properties and is configured to close the second opening.

In the liquid crystal panel according to one embodiment of the present invention, it is preferred that the sealing part is formed in a frame shape, and the second opening includes a plurality of annular openings, one opening of the plurality of annular openings being juxtaposed inside or outside of another opening, and an alignment film is provided between the light-shielding layer and the liquid crystal part, and in a range surrounded by the innermost annular opening of the second opening.

A liquid crystal display apparatus according to one embodiment of the present invention comprises the liquid crystal panel according to one embodiment of the present invention and an illumination device configured to illuminate the liquid crystal panel from a side of the first substrate.

A method of manufacturing the liquid crystal panel according to one embodiment of the present invention comprises a process of providing a transparent electrode and a wiring part having light-shielding properties on a first transparent substrate, a light-shielding layer providing process of providing a light-shielding layer having a first opening and a second opening on a second transparent substrate, a sealing material applying process of applying a photo-curable sealing material to be the sealing part to the second transparent substrate so as to close the second opening, a process of disposing the first transparent substrate and the second transparent substrate to face each other, such that the transparent electrode faces the first opening, and a process of irradiating the sealing material with light through the second opening from a side of the second transparent substrate so as to cure the sealing material.

In the method of manufacturing the liquid crystal panel according to one embodiment of the present invention, it is preferred that the sealing material has light-shielding properties, or has translucency and photosensitivity, the photosensitivity obtaining light-shielding properties by losing the translucence due to light exposure.

In the method of manufacturing the liquid crystal panel according to the embodiment of the present invention, it is preferred that the light-shielding layer providing process includes a process of laminating a light-shielding material layer to be the light-shielding layer on the second transparent substrate and a process of forming a first opening and a second opening including a plurality of annular openings, one opening of the plurality of annular openings being juxtaposed inside or outside of another opening, and the method further comprises, after ending the light-shielding layer providing process and before starting the sealing material applying process, a process of providing an alignment film in a range surrounded by the innermost annular opening of the second opening.

According to one embodiment of the present invention, the second opening of the light-shielding layer is closed by the sealing part having light-shielding properties.

Therefore, in the embodiment, there is no possibility of leaking the light through the second opening.

In addition, in the embodiment, it is not necessary to dispose the sealing part outside from the light-shielding layer. Thereby, in the embodiment, it is not necessary to increase an area of the second substrate for disposing the sealing part.

Further, in the embodiment, it is not necessary for the wiring part to have the opening. Thereby, in the embodiment, an increase in electrical resistance of the wiring part due to the opening included in the wiring part does not occur.

In addition, in the embodiment, it is not necessary to widen the wiring part for the purpose of decreasing the electrical resistance of the wiring part. Accordingly, in the embodiment, it is not necessary to increase the area of the first substrate for disposing a wide wiring part.

Furthermore, in the embodiment, the sealing material to be the sealing part is sufficiently irradiated with light through the second opening. Thereby, in the embodiment, the sealing material is sufficiently cured.

According to the preferred embodiment of the present invention, the second opening includes the plurality of annular openings of which one opening is juxtaposed inside or outside of another opening. In the preferred embodiment, the alignment film is provided in the range surrounded by the innermost annular opening of the second opening.

When providing the alignment film, a film material having flowability may be applied. In this case, the film material is applied to the range surrounded by the innermost annular opening of the second opening. Therefore, when the film material flows to be expanded in a plane direction, the film material is entered into the innermost annular opening. Thereafter, even when the film material tends to be further expanded, flowing of the film material is suppressed by the light-shielding layer present between the innermost annular opening and the annular opening adjacent to the innermost annular opening. Thereby, unnecessary diffusion of the applied film material is suppressed.

If the film material is unnecessary expanded, the alignment film closes the second opening, such that irradiating the sealing material with light through the second opening is blocked. In addition, since the alignment film is unnecessarily disposed between the second substrate and the sealing part, adhesion between the second substrate and the sealing part may be decreased so as to be peeled-off, or moisture may enter through the alignment film to deteriorate the display quality.

In other words, by suppressing unnecessary expansion of the film material, it is possible to suppress that irradiating the sealing material with light through the second opening is blocked by the alignment film. As a result, it is possible to suppress the uncured sealing material due to insufficient irradiation of light, and suppress eventually the deterioration in image quality due to the uncured sealing material. In addition, it is possible to suppress the decrease in adhesion between the second substrate and the sealing part due to unnecessary disposing of the alignment film therebetween, and prevent entering of the moisture through the alignment film.

According to the preferred embodiment of the present invention, the sealing part may be formed using the sealing material having light-shielding properties, or be formed using transparent sealing material which obtains light-shielding properties by sensitization. The sealing material having light-shielding properties has an advantage of being readily available at a low cost. Meanwhile, the transparent sealing material has an advantage that not only a portion near the second substrate but also a portion near the first substrate are easy to sufficiently receive light until it loses transparent.

According to the liquid crystal panel, the liquid crystal display apparatus, and the method of manufacturing the liquid crystal panel of one embodiment of the present invention, there is no possibility of leaking the light through the second opening of the light-shielding layer. In addition, in the embodiment, when manufacturing the liquid crystal panel, it is possible to sufficiently cure the sealing material by using the second opening. Further, in the embodiment, the increase in electrical resistance of the wiring part due to the opening included in the wiring part does not occur, and eventually an unnecessary delay in signal transmission does not occur.

Thereby, in the embodiment, it is possible to suppress the deterioration in image quality due to the light leakage, the uncured sealing material or the unnecessary delay in signal transmission.

Further, in the embodiment, it is not necessary to increase the area of the first substrate or the second substrate. Thereby, in the embodiment, it is possible to facilitate the narrowing of the frame of the liquid crystal display apparatus.

The above and further objects and features will more fully be apparent from the following detailed description with accompanying drawings.

BRIEF DESCRIPTION OF THE DRAWINGS

FIG. 6 is a schematic view for describing the manufacturing procedure of the liquid crystal panel.

FIG. 8 is a schematic view for describing the manufacturing procedure of the liquid crystal panel.

FIG. 10 is an enlarged schematic view for describing the manufacturing procedure of the liquid crystal panel.

FIG. 13 is a schematic view for describing the manufacturing procedure of the liquid crystal panel.

FIG. 16 is an enlarged plan view schematically illustrating a configuration of a liquid crystal panel according to Embodiment 2 of the present invention.

FIG. 17 is an enlarged plan view schematically illustrating a configuration of a liquid crystal panel according to Embodiment 3 of the present invention.

DETAILED DESCRIPTION

Figure 1:
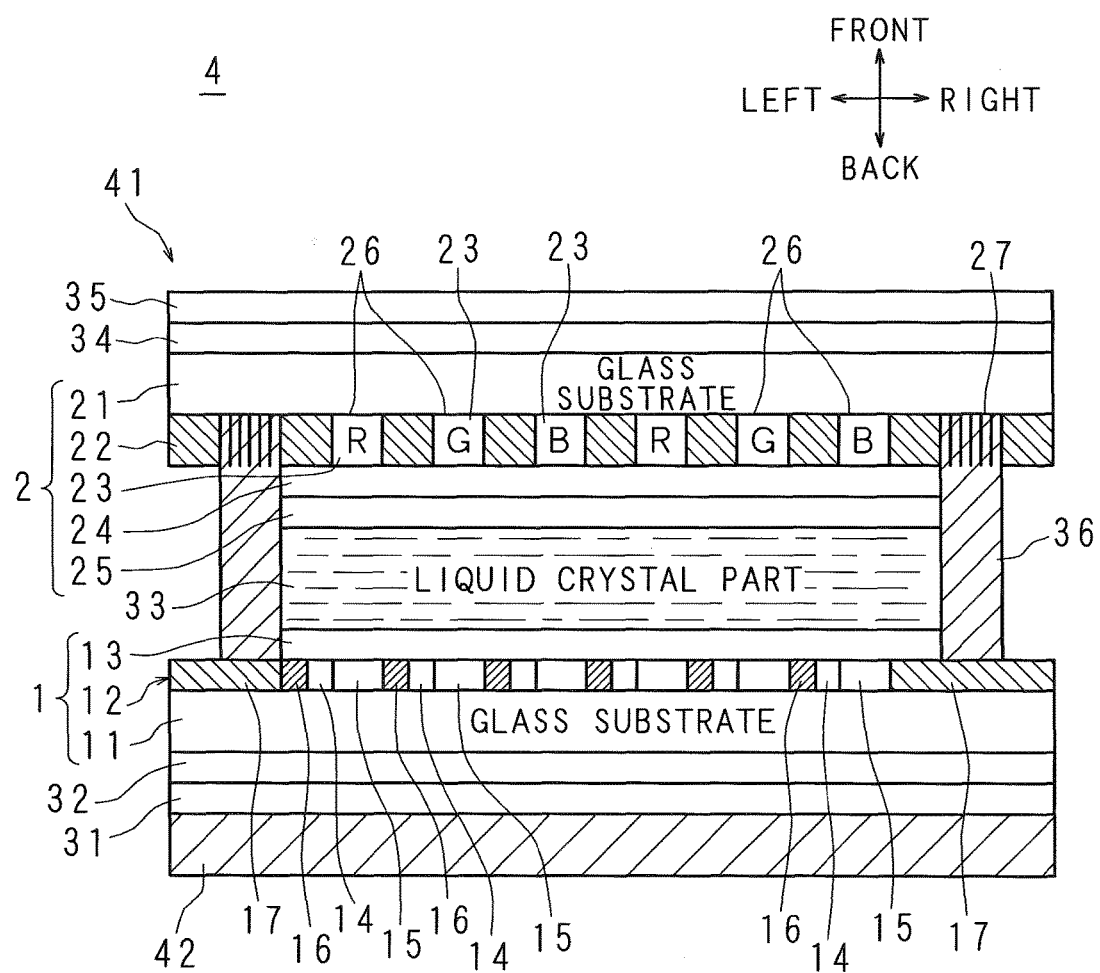
FIG. 1 is a schematic view illustrating a configuration of a liquid crystal display apparatus according to Embodiment 1 of the present invention.

Hereinafter, the present invention will be described in detail with reference to the accompanying drawings illustrating embodiments thereof. In the following description, upper and lower, back and front, and right and left illustrated by arrows in the drawings are used.

Embodiment 1

FIG. 1 is a schematic view illustrating a configuration of a liquid crystal display apparatus 4 according to Embodiment 1 of the present invention.

The liquid crystal display apparatus 4 is formed as a television receiving apparatus, a display or the like, for example. The liquid crystal display apparatus 4 displays a color image using RGB three primary colors. The liquid crystal display apparatus 4 has a display region formed in a rectangular shape. A display procedure of the color image in the liquid crystal display apparatus 4 is the same as the display procedure of the color image in the conventional liquid crystal display apparatus.

Figure 2:
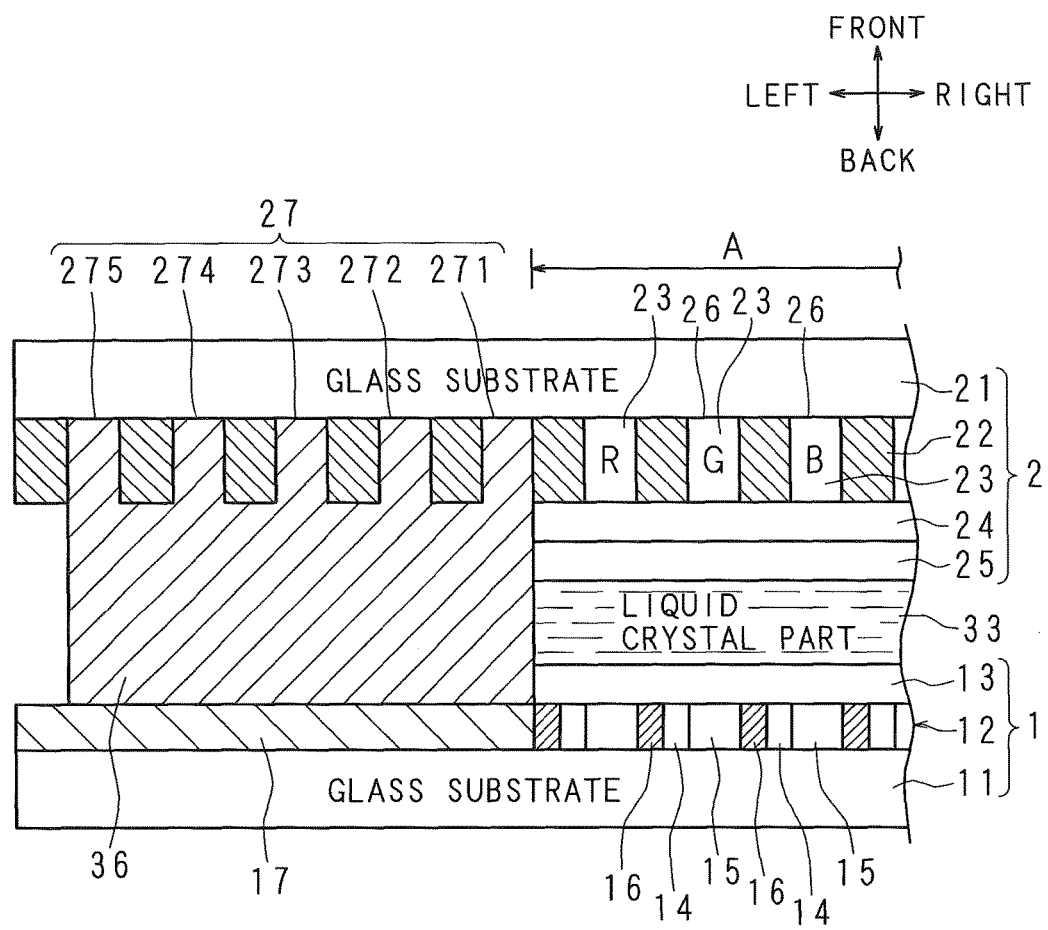
FIG. 2 is an enlarged schematic view illustrating a configuration of a liquid crystal panel included in the liquid crystal display apparatus.

FIG. 2 is an enlarged schematic view illustrating a configuration of a liquid crystal panel 41 included in the liquid crystal display apparatus 4. In more detail, FIG. 2 is an enlarged view near a sealing part 36 of the liquid crystal panel 41 illustrated in FIG. 1. FIG. 2 illustrates a TFT substrate 1, an opposite substrate 2, a liquid crystal part 33, and the sealing part 36, which are included in the liquid crystal panel 41.

Figure 3:
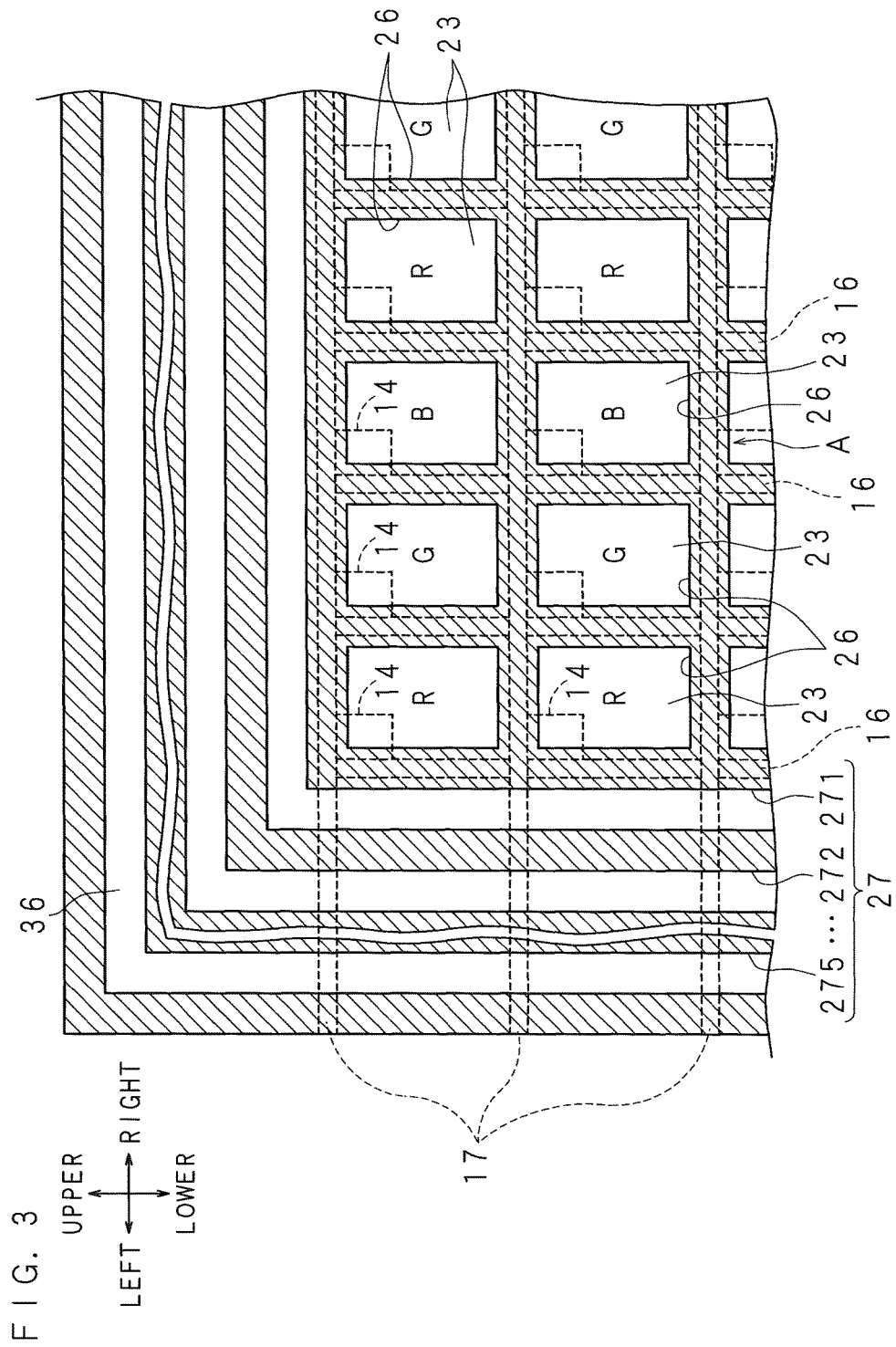
FIG. 3 is an enlarged plan view schematically illustrating the configuration of the liquid crystal panel.

FIG. 3 is an enlarged plan view schematically illustrating the configuration of the liquid crystal panel 41. FIG. 3 is a plan view in which a glass substrate 21, a polarizing plate 34, and a protective glass 35 of the liquid crystal panel 41, which will be respectively described below, are not illustrated, and illustrates an upper left corner by enlarging, among four corners of the liquid crystal panel 41.

In FIGS. 1 to 3, the portions indicated by hatching with oblique lines is a portion which is non-transparent.

First, the configuration of the liquid crystal display apparatus 4 will be described.

As illustrated in FIG. 1, the liquid crystal display apparatus 4 includes the liquid crystal panel 41 and a backlight unit (an illumination device) 42.

The backlight unit 42 is a direct type or an edge light type illumination device. The backlight unit 42 forms a back side of the liquid crystal display apparatus 4. The backlight unit 42 illuminates a front side thereof.

The liquid crystal panel 41 forms the front side of the liquid crystal display apparatus 4. The liquid crystal panel 41 includes the TFT substrate (a first substrate) 1, the opposite substrate (a second substrate) 2, a diffusion plate 31, polarizing plates 32 and 34, the liquid crystal part 33, the protective glass 35, and the sealing part 36.

The diffusion plate 31, the polarizing plate 32, the TFT substrate 1, the liquid crystal part 33, the opposite substrate 2, the polarizing plate 34, and the protective glass 35 are disposed on the front side of the backlight unit 42, from the back side to the front side in this order. Briefly, the liquid crystal panel 41 has the TFT substrate 1 facing the back side, and the opposite substrate 2 facing the front side.

The diffusion plate 31 and the polarizing plate 32 are both transparent, and are formed in a rectangular shape, respectively. The polarizing plate 32 is laminated on a back surface of a glass substrate 11 of the TFT substrate 1, which will be described below. The diffusion plate 31 is laminated on the back surface of the polarizing plate 32. The diffusion plate 31 and the polarizing plate 32 has the same configuration as the conventional diffusion plate and the polarizing plate.

As illustrated in FIGS. 1 and 2, the TFT substrate 1 includes the glass substrate 11, a TFT layer 12, and an alignment film 13. The glass substrate 11, the TFT layer 12, and the alignment film 13 are disposed from the back side to the front side in this order.

The glass substrate 11 is transparent, and is formed in a rectangular shape. The TFT layer 12 is laminated on a front surface of the glass substrate 11.

The TFT layer 12 includes a plurality of TFTs 14, 14, . . . which are respectively transparent, and a plurality of transparent electrodes 15, 15, . . . , and a plurality of signal wirings (a wiring pars) 16, 16, . . . , and a plurality of scanning wirings (the wiring part) 17, 17, . . . , which respectively have light-shielding properties. The transparent electrodes 15, 15, . . . , the signal wirings 16, 16, . . . , and the scanning wirings 17, 17, . . . are illustrated by dashed lines in FIG. 3.

The signal wirings 16, 16, . . . and the scanning wirings 17, 17, . . . respectively extend, on a front surface of the glass substrate 11, from a rectangular region corresponding to the display region of the liquid crystal display apparatus 4 (hereinafter, referred to as a display corresponding region A) over a rectangular frame-shaped region which is a peripheral portion of the display corresponding region A (hereinafter, referred to as a frame region). The respective signal wirings 16, 16, . . . are disposed in a vertical direction apart from each other in a horizontal direction. The respective scanning wirings 17, 17, . . . are disposed in the horizontal direction apart from each other in the vertical direction.

The transparent electrodes 15, 15, . . . are provided in the display corresponding region A on the front surface of the glass substrate 11. The transparent electrodes 15, 15, . . . are disposed in parallel in the respective vertical and horizontal directions apart from each other.

Each transparent electrode 15 corresponds to one point having any one color of RGB three primary colors in the color image. When each one point of RGB is considered to be one pixel, each transparent electrode 15 serves as a pixel electrode.

The transparent electrodes 15, 15, . . . and the respective drain electrodes of the TFTs 14, 14, . . . are electrically connected to each other with a one to one correspondence. A source electrode of each TFT 14 is electrically connected to any one of the signal wirings 16, 16, . . . . A gate electrode of each TFT 14 is electrically connected to any one of the scanning wirings 17, 17, . . . .

The transparent alignment film 13 is laminated in the display corresponding region A on a front surface of the TFT layer 12.

As illustrated in FIGS. 1 to 3, the opposite substrate 2 includes the glass substrate 21, a BM (a light-shielding layer) 22, RGB layers 23, 23, . . . , a transparent electrode 24, and an alignment film 25. The glass substrate 21, the BM 22 and the RGB layers 23, 23, . . . , the transparent electrode 24, and the alignment film 25 are disposed from the front side to the back side in this order.

The glass substrate 21 is transparent, and is formed in a rectangular shape. The BM 22 having light-shielding properties is laminated on the back surface of the glass substrate 21.

The display corresponding region A in the BM 22 is provided with a plurality of first openings 26, 26, . . . each of which is a rectangular shape. The first openings 26, 26, . . . are disposed in parallel in the respective vertical and horizontal directions apart from each other. The numbers of the first openings 26, 26, . . . in the vertical and horizontal directions are the same number as the numbers of the transparent electrodes 15, 15, . . . in the vertical and horizontal directions. In addition, arrangements of the first openings 26, 26, . . . in the vertical and horizontal directions correspond to the arrangements of the transparent electrodes 15, 15, . . . in the vertical and horizontal directions. Each first opening 26 corresponds to the one point having any one color of RGB three primary colors in the color image.

Each first opening 26 is closed by the RGB layer 23. Each RGB layer 23 is a transparent layer having any one color of RGB three primary colors.

The transparent electrode 24 is laminated in the display corresponding region A on the back surface of the BM 22 and RGB layers 23, 23, . . . . The transparent electrode 24 serves as a common electrode opposite to the transparent electrodes 15, 15, . . . of the TFT substrate 1.

The alignment film 25 which are transparent is laminated on the back surface of the transparent electrode 24.

A second opening 27 are formed in the frame region of the BM 22 so as to surround the display corresponding region A in a rectangular shape. The second opening 27 includes five annular openings 271, 272, 273, 274, and 275 each of which is a rectangular ring shape. The annular openings 271, . . . , 275 are juxtaposed from an inside (a side adjacent to the display corresponding region A) to an outside (a side apart from the display corresponding region A) in this order. Briefly, the annular openings 271, . . . , 275 are disposed in a nested shape, and the annular opening 271 is disposed at the innermost side. In the present embodiment, the annular openings 271, . . . , 275 have an equal width, and are juxtaposed at regular intervals.

Both of the transparent electrode 24 and the alignment film 25 are disposed in a range surrounded by the second openings 27 (in more detail, the annular opening 271).

The rectangular polarizing plate 34 is laminated on the front surface of the glass substrate 21. The rectangular protective glass 35 is laminated on the front surface of the polarizing plate 34. The polarizing plate 34 and the protective glass 35 have the same configuration as the conventional polarizing plate and the protective glass. The polarizing plates 32 and 34 transmit linearly polarized light orthogonal to each other.

The TFT substrate 1 and the opposite substrate 2 are disposed opposite to each other so that the display corresponding region A on the front side of the TFT substrate 1 and the display corresponding region A on the back side of the opposite substrate 2 face each other. In this case, the transparent electrodes 15, 15, . . . of the TFT substrate 1 face the first openings 26, 26, . . . (and eventually the RGB layers 23, 23, . . . which close the first openings 26, 26, . . . ) of the opposite substrate 2.

The sealing part 36 adheres the TFT substrate 1 and the opposite substrate 2 between the TFT substrate 1 and the opposite substrate 2. The sealing part 36 is disposed between the TFT substrate 1 and the opposite substrate 2, such that the TFT substrate 1 and the opposite substrate 2 are adhered through the sealing part 36.

The sealing part 36 is formed in a rectangular frame shape while having light-shielding properties. The sealing parts 36 close the second opening 27. Briefly, the sealing part 36 is disposed in the frame region.

The liquid crystal part 33 is transparent, and is disposed between the TFT substrate 1 and the opposite substrate 2, and in a space surrounded by the sealing part 36. In other words, the liquid crystal part 33 is sealed between the TFT substrate 1 and the opposite substrate 2 by the sealing part 36.

In general, an arrangement of liquid crystal molecules forming the liquid crystal part 33 is determined by a surface shape of the alignment films 13 and 25. Light made incident on the liquid crystal part 33 in this state is transmitted through the liquid crystal part 33 as it is. Herein, when a voltage is applied between at least one of the transparent electrodes 15, 15, . . . and the transparent electrode 24, the arrangement of liquid crystal molecules forming the liquid crystal part 33 is changed. Light made incident on the liquid crystal part 33 in this state is polarized by the liquid crystal part 33.

The backlight unit 42 irradiates the liquid crystal panel 41 with light from the back side (that is, the TFT substrate 1 side).

The light emitted by the backlight unit 42 is diffused by transmitting through the diffusion plate 31. The diffused light is transmitted through the polarizing plate 32, and then is made incident on the TFT substrate 1.

The light made incident on the TFT substrate 1 is sequentially transmitted through the glass substrate 11, the TFTs 14, 14, . . ., or the transparent electrodes 15, 15, . . ., and the alignment film 13, and then is made incident on the liquid crystal part 33.

The light made incident on the liquid crystal part 33 is transmitted through the liquid crystal part 33 as it is, or is polarized, and then is made incident on the opposite substrate 2.

The light made incident on the opposite substrate 2 is sequentially transmitted through the alignment film 25, the transparent electrode 24, the RGB layers 23, 23, . . . which close the first openings 26, 26, . . . , and the glass substrate 21, and then is emitted.

The light, which is transmitted through the liquid crystal part 33 as it is, is emitted from the opposite substrate 2, and then is shielded by the polarizing plate 34. The light polarized by the liquid crystal part 33 is emitted from the opposite substrate 2, and then is sequentially transmitted through the polarizing plate 34, and the protective glass 35 to be emitted to the outside.

The second opening 27 provided in the BM 22 is closed by the sealing part 36 having light-shielding properties. Therefore, there is no possibility of leaking the light through the second opening 27.

Herein, an optical density (OD) value of the sealing part 36 will be described.

It is preferable that the sealing part 36 has the OD value at the same level as the OD value of the BM 22. The BM 22 has an OD value of about "4.0." The liquid crystal part 33 has a thickness (vertical length) of about 2 μm to 5 μm, and the BM 22 has a thickness of about 0.5 μm to 3 μm, thereby the sealing part 36 has a height (vertical length) of about 2.5 μm to 8 μm. Therefore, it is preferable that the sealing part 36 has an OD value per unit length of "1.6" to "0.5".

Next, a manufacturing procedure of the liquid crystal panel 41 will be described.

FIGS. 4 to 15 are schematic views for describing the manufacturing procedure of the liquid crystal panel 41.

In the present embodiment, first, one large panel P3 (see FIG. 15) is formed, then the large panel P3 is divided, and thereby a plurality of liquid crystal panels 41, 41, . . . are simultaneously formed.

Hereinafter, in each part which is to be included in the large panel P3, a finally divided portion is denoted by a subscript p. For example, one diffusion plate 31p and one polarizing plate 32p is included in the large panel P3. The diffusion plate 31 and the polarizing plate 32 of the liquid crystal panel 41 are formed by dividing the diffusion plate 31p and the polarizing plate 32p which are included in the large panel P3. Meanwhile, a plurality of liquid crystal parts 33, 33, . . . , sealing parts 36, 36, . . . , and the like are included in the large panel P3, which are not divided.

In FIGS. 4 to 15, division positions of the large panel P3 are illustrated by dashed-two dotted lines.

Figure 4:
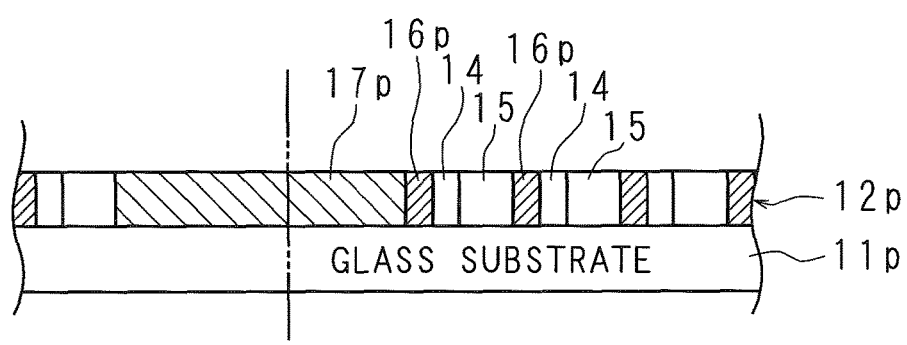
FIG. 4 is a schematic view for describing a manufacturing procedure of the liquid crystal panel.

First, a TFT layer 12p is provided on a front surface of a glass substrate (a first transparent substrate) 11p by a sputtering method, photolithography, or the like, for example, by a manufacturer (see FIG. 4).

The TFTs 14, 14, . . . and the transparent electrodes 15, 15, . . . , and signal wirings 16p, 16p, . . . and scanning wirings 17p, 17p, . . . corresponding to the signal wirings 16, 16, . . . and the scanning wirings 17, 17, . . . are included in the TFT layer 12p. Therefore, the gate electrodes of the respective the TFTs 14, 14, . . . , and the scanning wirings 17p, 17p, . . . are provided by the manufacturer. Then, the source electrodes of the respective TFTs 14, 14, . . . , and the signal wirings 16p, 16p, . . . are provided by the manufacturer. Further, the drain electrodes of the respective TFTs 14, 14, . . . , and the transparent electrodes 15, 15, . . . are provided by the manufacturer.

Figure 5:
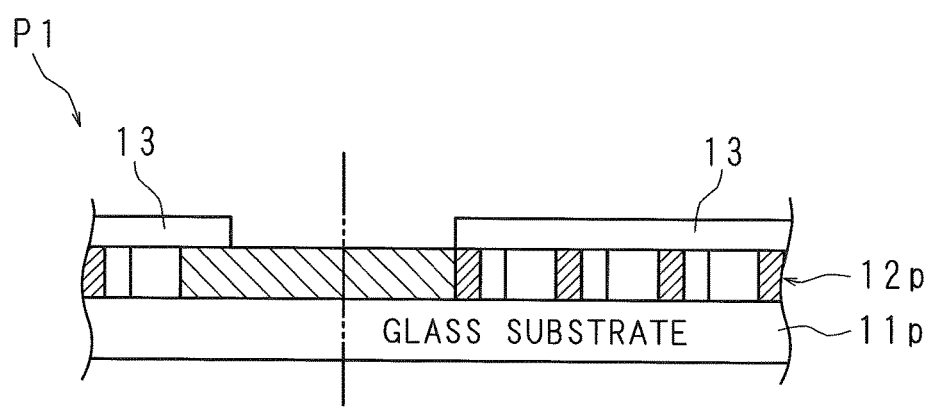
FIG. 5 is a schematic view for describing the manufacturing procedure of the liquid crystal panel.
Figure 7:
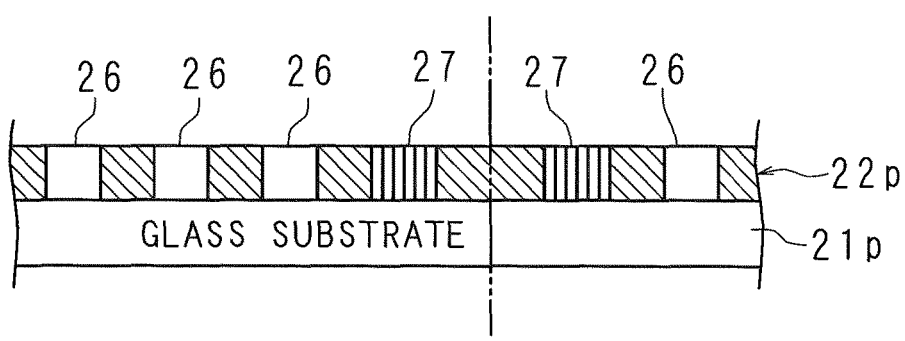
FIG. 7 is a schematic view for describing the manufacturing procedure of the liquid crystal panel.

Next, the alignment films 13, 13, . . . are provided in a range corresponding to the display corresponding region A on the front surface of the TFT layer 12p by the manufacturer (see FIG. 5). In this case, a film material is applied in a layer shape, in the range corresponding to the display corresponding region A on the front surface of the TFT layer 12p by the manufacturer. Then, heat treatment is executed on the applied film material by the manufacturer, such that the film material is cured to be the alignment films 13, 13, . . . .

By the above-described processes, a large panel P1 corresponding to the TFT substrates 1, 1, . . . is formed. A forming sequence of the large panel P1 may be the same as the conventional sequence.

Next, a light-shielding material layer 220 is provided on the back surface of a glass substrate (a second transparent substrate) 21p by a slit coating method or a spin coating method, for example, by the manufacturer (see FIG. 6).

Further, the first openings 26, 26, . . . are formed in the range corresponding to the display corresponding region A in the light-shielding material layer 220, and the second openings 27, 27, . . . are formed in the range corresponding to the frame region of the light-shielding material layer 220, by the manufacturer. As a result, the light-shielding material layer 220 becomes the BM 22p in which the first openings 26, 26, . . . and the second openings 27, 27, . . . are formed (see FIG. 7). The first openings 26, 26, . . . and the second openings 27, 27, . . . may be simultaneously formed, or may be individually formed by the photolithography, for example.

Then, the RGB layers 23, 23, . . . which close the first openings 26, 26, . . . formed in the BM 22p are provided on the back surface of the glass substrate 21p which is exposed through the first openings 26, 26, . . . , by the manufacturer (see FIG. 8). The RGB layers 23, 23, . . . are formed by the photolithography, for example.

Figure 9:
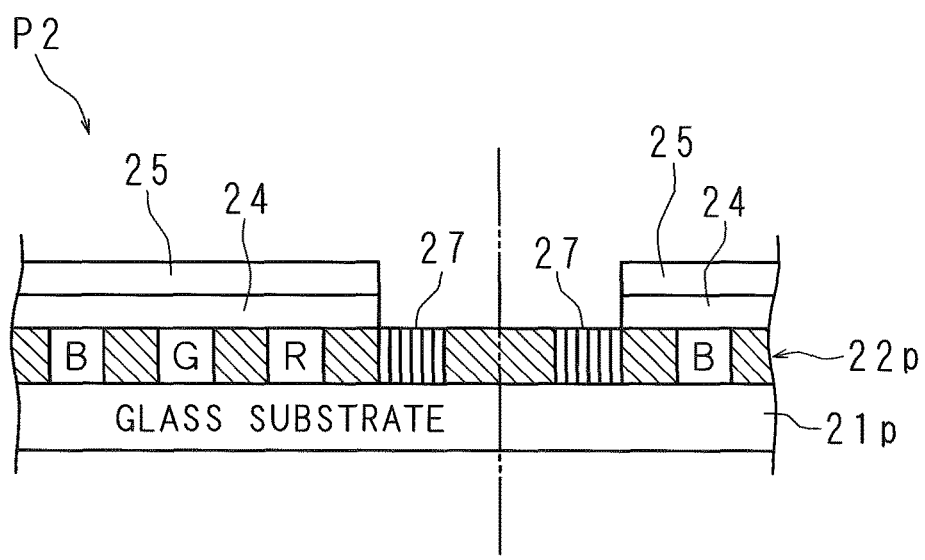
FIG. 9 is a schematic view for describing the manufacturing procedure of the liquid crystal panel.

Next, the transparent electrodes 24, 24, . . . and the alignment films 25, 25, . . . are sequentially laminated in the range corresponding to the display corresponding region A on the back surface of the glass substrate 21p (that is, in the range surrounded by the innermost annular opening 271 of each second opening 27), by the manufacturer (see FIG. 9).

By the above-described processes, a large panel P2 corresponding to the opposite substrates 2, 2, . . . is formed.

Herein, a forming sequence of the transparent electrodes 24, 24, . . . and the alignment films 25, 25, . . . will be described in detail.

The transparent electrodes 24, 24, . . . are formed in the range corresponding to the display corresponding region A on the back surface of the glass substrate 21p by the sputtering method, for example, by the manufacturer. Next, the film material is applied to the back surface of the transparent electrodes 24, 24, . . . in a layer shape, thereby forming the film material layers 250, 250, . . . , by the manufacturer (see FIG. 10).

The film material has flowability. Therefore, the film material layer 250 may intend to be diffused in a plane direction of the glass substrate 21p. However, since the annular opening 271 is provided adjacent to a range in which the film material layer 250 is formed, the flowing film material inflows into the annular opening 271. The film material flowing into the annular opening 271 is dammed up by the BM 22p between the annular openings 271 and 272.

Thereby, unnecessary diffusion of the film material layer 250 is suppressed. In addition, closing the second opening 27 other than the annular opening 271 by the film material layer 250 may be suppressed.

Next, the heat treatment is executed on the film material layers 250, 250, . . . by the manufacturer, such that the film material layers 250, 250, . . . are cured, and thus become the alignment films 25, 25, . . . .

Figure 11:
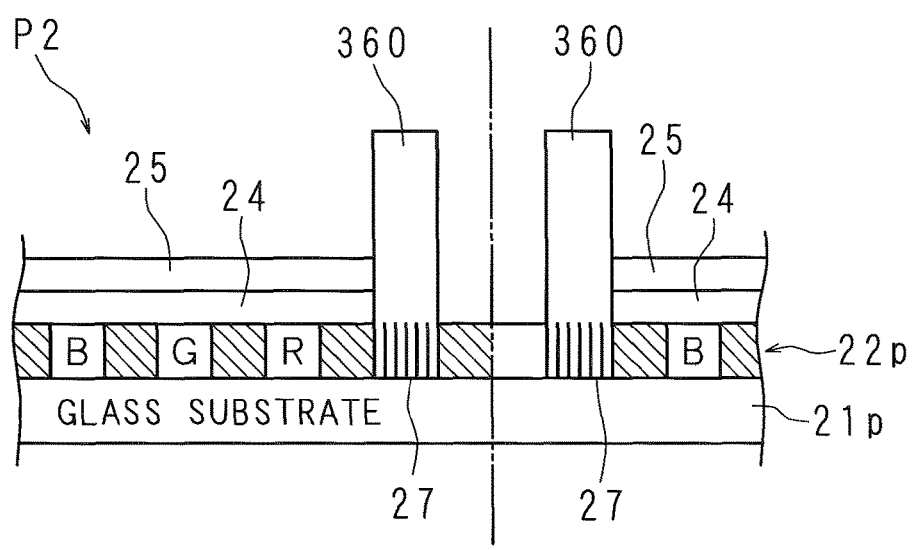
FIG. 11 is a schematic view for describing the manufacturing procedure of the liquid crystal panel.

After the large panel P2 is formed, ultraviolet curable sealing materials 360, 360, . . . are applied to the back surface of the glass substrate 21p which is exposed through the second openings 27, 27, . . . , and the back surface of the BM 22p which is an opening peripheral edge part of the respective annular openings 271, . . . , 275 of the second opening 27, by the manufacturer (see FIG. 11). In this case, the applied sealing materials 360, 360, . . . close the second openings 27, 27, . . . . The applied sealing material 360 is formed in a rectangular frame shape.

The sealing material 360 has light-shielding properties. For example, the sealing material 360 is a black material including carbon, titanium or the like.

Further, the sealing material 360 may be a material which is cured by light other than the ultraviolet rays.

In addition, the sealing material 360 may be a photo curable material which is translucent, and is photosensitive that obtains light-shielding properties by losing the translucence due to light exposure. An example of such a material may include, for example, an ultraviolet curable resin that contains silver bromide.

Furthermore, the sealing material 360 may be a photo curable material which is translucent, and is heat sensitive that obtains light-shielding properties by losing the translucence due to heat exposure. In this case, after irradiating the sealing material 360 with ultraviolet rays as described below, it is necessary to heat the large panel P2.

Figure 12:
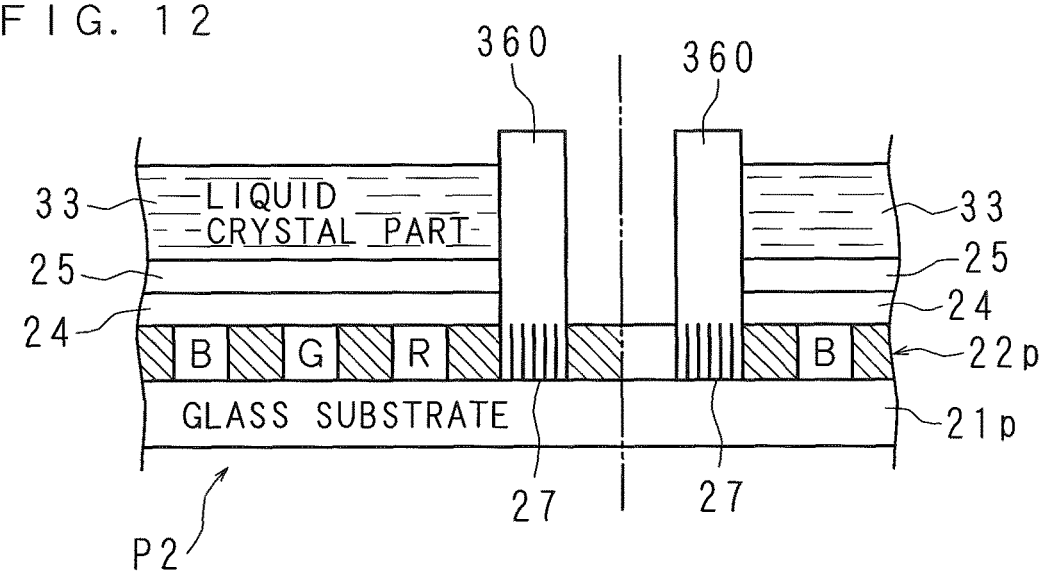
FIG. 12 is a schematic view for describing the manufacturing procedure of the liquid crystal panel.

Next, liquid crystal is dropped to the back surface of each alignment film 25, such that the liquid crystal part 33 is provided in a space surrounded by each sealing material 360, by the manufacturer (see FIG. 12).

Further, such the transparent electrodes 15, 15, . . . face the first openings 26, 26, . . . , the front surface of the large panel P1 and the back surface of the large panel P2 are disposed opposite to each other, and the large panels P1 and P2 are adhered, by the manufacturer (see FIG. 13). In this case, each sealing material 360 is adhered in the range corresponding to the frame region of the large panel P1. In addition, in this case, each liquid crystal part 33 is disposed between the large panels P1 and p2 and in the space surrounded by the sealing materials 360.

Figure 14:
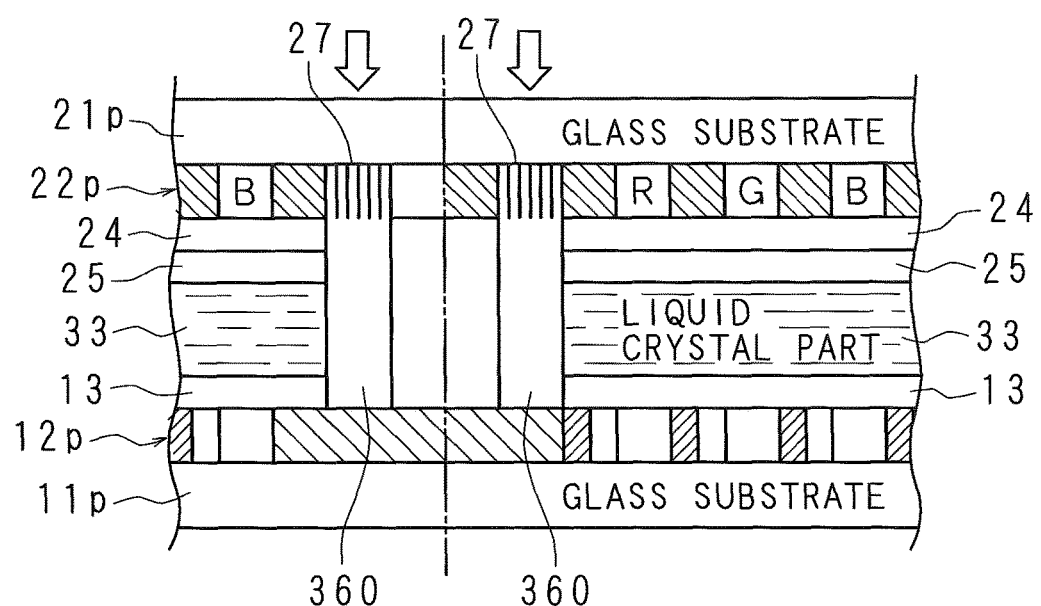
FIG. 14 is a schematic view for describing the manufacturing procedure of the liquid crystal panel.
Figure 15:
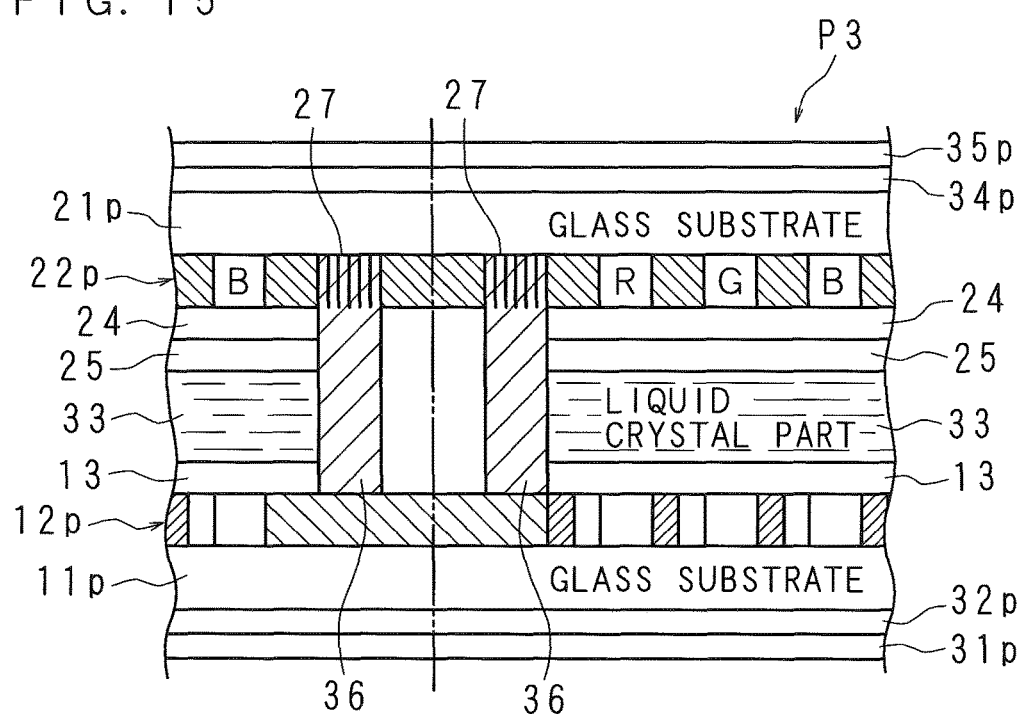
FIG. 15 is a schematic view for describing the manufacturing procedure of the liquid crystal panel.

Then, from the back side of the large panel P2, the sealing materials 360, 360, . . . are irradiated with ultraviolet rays through the second openings 27, 27, . . . from the glass substrate 21p side, by the manufacturer (see FIG. 14). As a result, the sealing materials 360, 360, . . . are cured, and thus, as illustrated in FIG. 15, become the sealing parts 36, 36, . . . .

The sealing material 360 is a black material, and has light-shielding properties. Therefore, the sealing part 36 is also the black material, and has the light-shielding properties.

Further, when the sealing material 360 is a material which is photosensitive that obtains light-shielding properties by losing the translucence due to light exposure, the sealing material 360 is translucent, but the sealing part 36 has the light-shielding properties.

Furthermore, the polarizing plate 32p and the diffusion plate 31p are sequentially laminated on the back surface of the glass substrate 11p, and the polarizing plate 34p and the protective glass 35p are sequentially laminated on the front surface of the glass substrate 21p, by the manufacturer.

By the above-described processes, a large panel P3 is formed.

After the large panel P3 is formed, the large panel P3 is divided, thus to obtain the liquid crystal panels 41, 41, . . . , by the manufacturer (not illustrated).

In the present embodiment, the sealing material 360 is cured by irradiating with ultraviolet rays, but after irradiating with the ultraviolet rays, the sealing material 360 may be further cured by heating the same. In this case, a step of heating the large panel P2 after irradiating with the ultraviolet rays is added to the manufacturing procedure of the liquid crystal panel 41.

In the liquid crystal display apparatus 4 including the above-described liquid crystal panel 41, it is possible to achieve greater narrowing of the frame than the conventional liquid crystal display apparatus including the liquid crystal panel described in Patent Document 1. The reason is that, in the case of the liquid crystal panel 41, the sealing part 36 is disposed on the BM 22. On the other hand, in the case of the liquid crystal panel described in Patent Document 1, the sealing part is disposed at the outside from the BM.

In addition, in the liquid crystal display apparatus 4, it is possible to more greatly suppress a deterioration in image quality due to light leakage than the conventional liquid crystal display apparatus including the liquid crystal panel described in Patent Document 2. The reason is that, in the case of the liquid crystal panel 41, the second opening 27 provided in the BM 22 is closed by the sealing part 36 having light-shielding properties. On the other hand, in the case of the liquid crystal panel described in Patent Document 2, since the opening (corresponding to the second opening 27) provided in the BM is partially closed by the sealing part, the light may be leaked through the opening.

Further, in the liquid crystal display apparatus 4, it is possible to more greatly suppress the deterioration in image quality due to an increase in electrical resistance of the signal wirings 16, 16, . . . or the scanning wirings 17, 17, . . . than the conventional liquid crystal display apparatus including the liquid crystal panel described in Patent Document 3. The reason is that, in the case of the liquid crystal panel 41, both of the signal wirings 16, 16, . . . and the scanning wirings 17, 17, . . . are not provided with the opening. On the other hand, in the case of the liquid crystal panel described in Patent Document 3, since the wiring part (corresponding to the signal wirings 16, 16, . . . or the scanning wirings 17, 17, . . . ) drawn out in the frame region is provided with the opening, the electrical resistance of the wiring part is increased.

Otherwise, in the liquid crystal display apparatus 4, it is possible to more greatly narrow the frame than the conventional liquid crystal display apparatus including the liquid crystal panel described in Patent Document 3. The reason is that, for the purpose of decreasing the electrical resistance of the signal wirings 16, 16, . . . or the scanning wirings 17, 17, . . . , it is not necessary to widen the signal wirings 16, 16, . . . or the scanning wirings 17, 17, . . . . On the other hand, in the case of the liquid crystal panel described in Patent Document 3, in order to decrease the electrical resistance of the wiring part, it is necessary to widen the wiring part.

Furthermore, in the liquid crystal display apparatus 4, it is possible to more greatly suppress the deterioration in image quality due to impurities eluted to the liquid crystal part 33 from the uncured sealing material 360. The reason is that, in the case of the liquid crystal panel 41, it is possible to sufficiently irradiate the sealing material 360 with ultraviolet rays through the second opening 27.

Herein, a case in which the annular opening 271 is closed by the alignment film 25 may be considered. In this case, irradiating the sealing material 360 with the ultraviolet rays through the annular opening 271 may be blocked by the alignment film 25. However, irradiating the sealing material 360 with the ultraviolet rays through the annular openings 272, . . . , 275 is not blocked by the alignment film 25. Thereby, it is possible to sufficiently irradiate the sealing material 360 with ultraviolet rays.

In addition, in the liquid crystal display apparatus 4, it is possible to watertightly seal the liquid crystal part 33. The reason is that, in the case of the liquid crystal panel 41, the sealing part 36 and the opposite substrate 2 are sufficiently adhered. As a result, it is possible to suppress the liquid crystal part 33 from being deteriorated by moisture entered from the outside.

Herein, the case in which the annular opening 271 is closed by the alignment film 25 may be considered. In this case, in the vicinity of the annular opening 271, the alignment film 25 is unnecessarily disposed therebetween, adhesion between the sealing part 36 and the opposite substrate 2 is decreased. However, the annular openings 272, . . . , 275 are not closed by the alignment film 25. Briefly, in the vicinity of the annular openings 272, . . . , 275, the alignment film 25 is not disposed therebetween. Therefore, the sealing part 36 and the opposite substrate 2 are sufficiently adhered. Further, since the alignment film 25 does not unnecessarily extend to the outside of the sealing part 36, there is no possibility of the moisture entering into the sealing part 36 through the alignment film 25.

In the present embodiment, the sealing part 36 is a black material. The reason is that, since the black material easily absorbs visible rays, light leakage is easily suppressed. However, if the sealing part 36 has light-shielding properties, it is not limited to the black material.

In addition, in the present embodiment, the second opening 27 uses the annular openings 271, . . . , 275, but it is not limited thereto. For example, the second opening 27 may be configured in such a manner that an inner narrow annular opening and an outer wide annular opening are formed in a nested shape. In this case, flowing of the film material is prevented by the BM 22p between the inner narrow annular opening and the outer wide annular opening. In addition, it is possible to efficiently irradiate the sealing material 360 with ultraviolet rays through the wide annular opening.

Embodiment 2

FIG. 16 is an enlarged plan view schematically illustrating a configuration of a liquid crystal panel 41 according to Embodiment 2 of the present invention. FIG. 16 corresponds to FIG. 3 of Embodiment 1.

The liquid crystal panel 41 of the present embodiment has substantially the same configuration as the liquid crystal panel 41 of Embodiment 1. Hereinafter, a difference from Embodiment 1 will be described, and the other portions corresponding to Embodiment 1 will be denoted by the same reference numerals, and will not be described.

The second opening 27 of Embodiment 1 is formed by using a plurality of thin annular openings.

A second opening 27 of Embodiment 2 is formed by using one thick annular opening.

If the second opening 27 have the same width as that of Embodiment 1, for aperture ratios of the BMs 22 relating to the second opening 27, the second opening 27 of the present embodiment has a higher value than that of Embodiment 1. The reason is that, in the second opening 27 of Embodiment 1, the BM 22 is present between the annular openings 271, . . . , 275.

The above-described liquid crystal panel 41 may more efficiently irradiate the sealing material 360 with ultraviolet rays through the second opening 27 than the case of Embodiment 1.

However, in the case of the present embodiment, it is preferable that the alignment film 25 does not close the second opening 27. For this, for example, as a film material to be the alignment film 25, using a material having a low flowability may be conceived.

Embodiment 3

FIG. 17 is an enlarged plan view schematically illustrating a configuration of a liquid crystal panel 41 according to Embodiment 3 of the present invention. FIG. 17 corresponds to FIGS. 3 and 16 of Embodiments 1 and 2.

The liquid crystal panel 41 of the present embodiment has substantially the same configuration as the liquid crystal panels 41 of Embodiments 1 and 2. Hereinafter, a difference from Embodiments 1 and 2 will be described, and the other portions corresponding to Embodiment 1 will be denoted by the same reference numerals, and will not be described.

The second opening 27 of the present embodiment is formed by using a plurality of annular openings whose respective lengthwise directions are disposed in the horizontal direction. Furthermore, the second opening 27 of the present embodiment is not limited to the horizontal direction, and for example, it may be configured by using a plurality of annular openings whose respective lengthwise directions are disposed in the vertical direction.

As described above, the shape of the second opening 27 is not limited to the configuration described in Embodiments 1 and 2. In other words, the shape of the second opening 27 may be appropriately selected depending on the irradiation efficiency of the ultraviolet rays to the sealing material 360, and/or easiness in formation of the second opening 27, etc.

Further, in Embodiments 1 to 3 of the present invention, the case in which the liquid crystal part 33 is provided by a drop injection method is exemplified, but also in a case in which the liquid crystal part 33 is provided by a vacuum injection method, the present invention may be applied.

Briefly, the liquid crystal panel 41 has a high degree of freedom in design.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

In addition, as long as it has the effects of the present invention, the liquid crystal display apparatus 4 and the liquid crystal panel 41 may include components which are not disclosed in Embodiments 1 to 3.

Components (technical characteristics) disclosed in each embodiment may be combined with each other, and by combining these components, new technical characteristics may be formed.

DESCRIPTION OF REFERENCE NUMERALS

It is noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A liquid crystal panel comprising:
   a first substrate which is transparent and is provided with a transparent electrode and a wiring part having light-shielding properties in a display region of the first substrate;
   a second substrate which is transparent and is provided with a light-shielding layer having a first opening and is disposed opposite to the first substrate so that the transparent electrode faces the first opening;
   a liquid crystal part disposed between the first substrate and the second substrate; and
   a sealing part configured to seal the liquid crystal part between the first substrate and the second substrate, wherein
   a plurality of annular openings, one opening of the plurality of annular openings being juxtaposed inside of another opening, are provided outside the display region of the light-shielding layer so as to surround the display region,
   an alignment film is provided between the light-shielding layer and the liquid crystal part,
   the sealing part has light-shielding properties,
   a first annular opening positioned at the innermost side among the plurality of annular openings provided outside the display region of the light-shielding layer is closed by the sealing part or the alignment film, and
   one or more annular openings including a second annular opening positioned next to the first annular opening among the plurality of annular openings are closed by the sealing part.

2. A liquid crystal display apparatus comprising:
   the liquid crystal panel according to claim 1; and
   an illumination device configured to illuminate the liquid crystal panel from a side of the first substrate.

3. A method of manufacturing the liquid crystal panel according to claim 1, comprising:
   a process of providing a transparent electrode and a wiring part having light-shielding properties on a display region of a first transparent substrate;
   a light-shielding layer providing process of providing a light-shielding layer on a second transparent substrate, a first opening being provided in the display region of the light shielding layer and a plurality of annular openings, one opening of the plurality of annular openings being juxtaposed inside of another opening, being provided outside the display region of the light shielding layer so as to surround the display region;
   a process of applying a film material of an alignment film to the display region of the second transparent substrate provided with at least the light-shielding layer;
   a process of providing the alignment film by curing the film material which has diffused to flow into a first annular opening positioned at the innermost side among the plurality of annular openings provided outside the display region of the light-shielding layer or the film material which has diffused not to flow into the first annular opening;
   a sealing material applying process of applying a photo-curable sealing material to be the sealing part to the second transparent substrate so as to close the one or more annular openings including the first annular opening that the film material has not flowed into and a second annular opening positioned next to the first annular opening among the plurality of annular openings;
   a process of providing a liquid crystal part in a space surrounded by the sealing material;
   a process of disposing the first transparent substrate and the second transparent substrate to face each other, such that the transparent electrode faces the first opening; and
   a process of irradiating the sealing material with light through the annular openings from a side of the second transparent substrate so as to cure the sealing material.

4. The method of manufacturing the liquid crystal panel according to claim 3, wherein
   the sealing material has light-shielding properties, or has translucency and photosensitivity, the photosensitivity obtaining light-shielding properties by losing the translucence due to light exposure.

5. The method of manufacturing the liquid crystal panel according to claim 3, wherein
   in the sealing material applying process,
   the sealing material is applied to the second transparent substrate so as to close the first annular opening that the film material has not flowed into and all the annular openings excluding the first annular opening among the plurality of annular openings provided outside the display region of the light-shielding layer.

6. The method of manufacturing the liquid crystal panel according to claim 3, wherein the sealing part is a black material.

7. The liquid crystal panel according to claim 1, wherein
   the first annular opening which is not closed by the alignment film and all the annular openings excluding the first annular opening among the plurality of annular openings provided outside the display region of the light-shielding layer are closed by the sealing part.

8. The liquid crystal panel according to claim 1, wherein the sealing part is a black material.

* * * * *